(12) United States Patent
Dallala et al.

(10) Patent No.: US 10,191,766 B2
(45) Date of Patent: Jan. 29, 2019

(54) AUTHORING AND RUNNING TASK-BASED FLOWS WITHIN A COMPUTING SYSTEM

(71) Applicant: Microsoft Technology Licensing, LLC, Redmond, WA (US)

(72) Inventors: Daniel Dallala, Seattle, WA (US); Hao Zhou, Issaquah, WA (US); Tobin James Zerba, Seattle, WA (US); Mesganaw G. Anteneh, Redmond, WA (US); Indrojit N. Deb, Sammamish, WA (US); Nirav Shah, Bothell, WA (US); Elizabeth Rose Steinke, Seattle, WA (US); Shashi Ranjan, Redmond, WA (US); Bharath Swaminathan, Renton, WA (US); Richard L. Dickinson, Seattle, WA (US); Monisha Rochlani, Redmond, WA (US); Tong Gao, Redmond, WA (US); Jianjun Wang, Bellevue, WA (US); Zhi Jun Zhao, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 15/162,984

(22) Filed: May 24, 2016

(65) Prior Publication Data

US 2017/0102966 A1    Apr. 13, 2017

Related U.S. Application Data

(60) Provisional application No. 62/240,883, filed on Oct. 13, 2015.

(51) Int. Cl.
*G06F 9/451*  (2018.01)
*G06F 9/455*  (2018.01)
*G06F 9/48*  (2006.01)

(52) U.S. Cl.
CPC ............ *G06F 9/4843* (2013.01); *G06F 9/451* (2018.02); *G06F 9/45512* (2013.01)

(58) Field of Classification Search
CPC ... G06F 9/4843; G06F 9/4443; G06F 9/45512
See application file for complete search history.

(56) References Cited

U.S. PATENT DOCUMENTS 7,707,505 B1 *  4/2010  Ohrt ................. G06F 17/30893
                                                715/738
7,711,694 B2    5/2010  Moore
                        (Continued)

FOREIGN PATENT DOCUMENTS

EP    1445692 A2    8/2004
EP    2722752 A2    4/2014

OTHER PUBLICATIONS

"Customizing Existing Pages", Retrieved on: Sep. 8, 2015, Available at: http://docs.oracle.com/cd/E36909_01/fusionapps.1111/e16691/customize-pages.htm.

(Continued)

*Primary Examiner* — Emerson C Puente
*Assistant Examiner* — Jonathan R Labud
(74) *Attorney, Agent, or Firm* — Christopher J. Volkmann; Kelly, Holt & Christenson, PLLC

(57) ABSTRACT

A task-based sub-application surfaces only controls that are needed to perform a task, from a plurality of different forms in a parent application. A sub-application system runs the sub-application by executing navigation logic and maintaining a separate navigation stack, so that the user can perform a task without the computer system needing to surface entire forms where only a small subset of the controls on those forms are needed to perform the task.

20 Claims, 15 Drawing Sheets

(56) References Cited

U.S. PATENT DOCUMENTS

| | | |
|---|---|---|
| 7,716,278 B2 | 5/2010 | Beringer et al. |
| 7,818,714 B2 | 10/2010 | Ryan et al. |
| 7,865,837 B1 | 1/2011 | Huff et al. |
| 8,095,411 B2 | 1/2012 | Beringer et al. |
| 8,255,813 B2 | 8/2012 | Yaseen et al. |
| 8,693,995 B2 | 4/2014 | Fisher |
| 8,726,234 B2 | 5/2014 | Mital et al. |
| 9,064,220 B2 | 6/2015 | Brosche et al. |
| 2009/0228775 A1 | 9/2009 | Sullivan et al. |
| 2013/0346889 A1 | 12/2013 | Beringer et al. |
| 2014/0075413 A1 | 3/2014 | Binjrajka |
| 2014/0250164 A1* | 9/2014 | Marx ................ H04L 67/18 709/203 |
| 2014/0281959 A1 | 9/2014 | Dominick et al. |
| 2015/0012329 A1 | 1/2015 | Prakash et al. |

OTHER PUBLICATIONS

International Search Report and Written Opinion for International Patent Applicaion No. PCT/US2016/054575, dated Dec. 22, 2016, date of filing: Sep. 30, 2016, 13 pages.

International Preliminary Report on Patentability for International Patent Application No. PCT/US2016/054575, dated Jul. 20, 2017, date of filing Sep. 30, 2016, 9 pages.

"Second Written Opinion Issued in PCT Application No. PCT/US2016/054575", dated May 23, 2017, 8 Pages.

* cited by examiner

AUTHORING AND RUNNING TASK-BASED FLOWS WITHIN A COMPUTING SYSTEM

CROSS-REFERENCE TO RELATED APPLICATION

The present application is based on and claims the benefit of U.S. provisional patent application Ser. No. 62/240,883, filed Oct. 13, 2015, the content of which is hereby incorporated by reference in its entirety.

BACKGROUND

Computer systems are currently in wide use. Some computer systems run an application that has multiple different processes. The processes may be manually driven processes, or machine driven processes, that are executed by the computer.

In such computing systems, the processes are often related to, or operate on, data objects that are defined in the computing system and that are populated with data stored in tables in an underlying data store. The application objects (sometimes referred to as entities) may have callable methods that can be invoked in order to perform various functions using the object. In addition, each object (or at least some of the objects) may be represented by a page or form that is surfaced, and populated, in order to visualize and use the object. The processes often operate on, or at least are related to, the objects.

Therefore, in order to perform a process, a user often needs to control the computing system to surface a form corresponding to an object, and then perform operations relative to that object using that form, then to close the form and open another form, corresponding to another object and perform operations relative to that form, etc. This can continue, through multiple different forms.

There may be thousands of different forms in such computing systems. Each form may have hundreds of different controls or control states. Therefore, in order for a user to perform a process, this can consume a great deal of processing overhead in order to access the underlying data store so that each form can be populated and surfaced for the user, and then saved back to the underlying data store once the user has finished performing operations on that form and corresponding object. This type of process may also be relatively cumbersome for the user.

The discussion above is merely provided for general background information and is not intended to be used as an aid in determining the scope of the claimed subject matter.

SUMMARY

A task-based sub-application surfaces only controls that are needed to perform a task, from a plurality of different forms in a parent application. A sub-application system runs the sub-application by executing navigation logic and maintaining a separate navigation stack, so that the user can perform a task without the computer system needing to surface entire forms where only a small subset of the controls on those forms are needed to perform the task.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
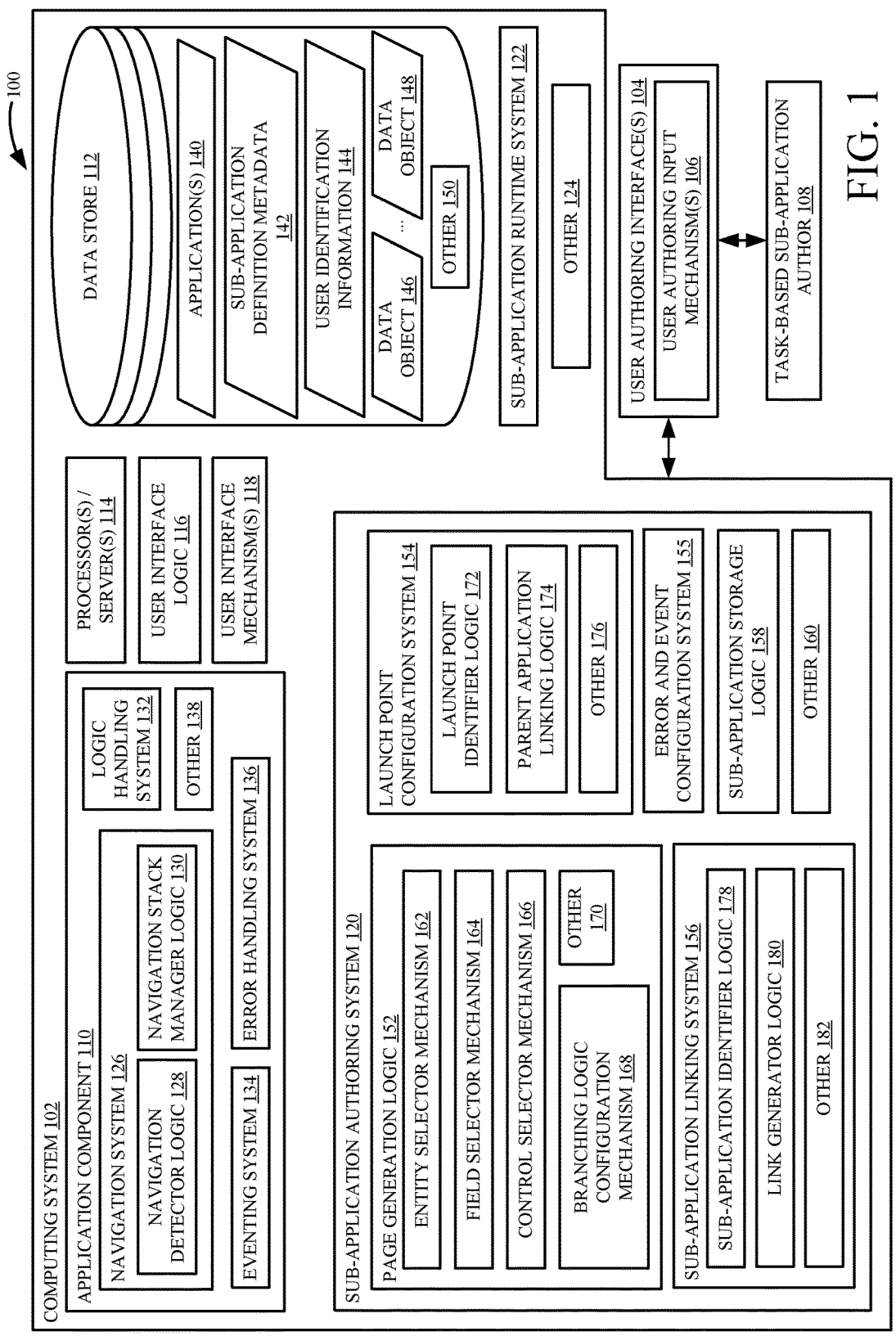
FIG. 1 is a block diagram of one example of a computing system having a task-based sub-application authoring system.

FIG. 1 is a block diagram of one example of a computing system architecture 100 that includes computing system 102. Computing system 102 illustratively generates user authoring interfaces 104 with user authoring input mechanisms 106 for interaction by a task-based sub-application author 108. Author 108 illustratively interacts with user input mechanisms 106 in order to author a task-based sub-application (also referred to herein as a task-based flow).

Computing system 102 illustratively includes application component 110, data store 112, one or more processors or servers 114, user interface logic 116, user interface mechanisms 118, sub-application authoring system 120, sub-application runtime system 122, and it can include other items 124. Before describing the overall operation of computing system 102 in more detail, a brief discussion of some of the items in computing system 102, and their functionality, will first be provided.

Application component 110 illustratively includes navigation system 126 (which, itself, can include navigation detector logic 128 and navigation stack manager logic 130). Component 110 also illustratively includes logic handling system 132, eventing system 134, error handling system 136, and it can include other items 138.

Data store 112 illustratively includes one or more applications 140, sub-application definition metadata 142 that defines task-based sub-applications that can run from within one or more of the applications 140, user identification information 144, and a set of data objects 146-148. Data store 112 can include other items 150 as well.

Application component 110 illustratively loads and runs applications 140 that allow a user to perform processes within computing system 100. Sub-application runtime system 122 illustratively launches and runs a task-based sub-application (or task-based flow) from within an application (e.g., a parent application) run by application component 110.

In running a parent application 140, navigation system 126 can navigate the user through various user interface displays or forms generated by the running application. Navigation detector logic 128 can detect navigation inputs (such as from a user, or automatic inputs) and navigation stack manager logic 130 manages a navigation stack, as the application is running. Logic handling system 132 illustratively handles (such as executes) logic contained on, or associated with, the forms that the user is navigating through, in running the application. Eventing system 134 performs eventing functionality (such as notifications, event handling, etc.) and error handling system 136 performs error handling functionality (such as generating error messages, etc.) for the running application. The application illustratively operates on data objects 146-148 in data store 112, and it can perform a wide variety of other functionality and operate on other records as well.

In addition, while an application is running, the user interface logic 116 illustratively controls user interface mechanisms 118 in order to generate user interfaces for a user. The user interface mechanisms 118 can include a wide variety of different types of mechanisms, such as display screens, touch sensitive display screens, point and click devices, a keyboard, speech recognition components so that a user can provide speech inputs, speakers, a microphone, or a wide variety of other user interface mechanisms.

Figure 3:
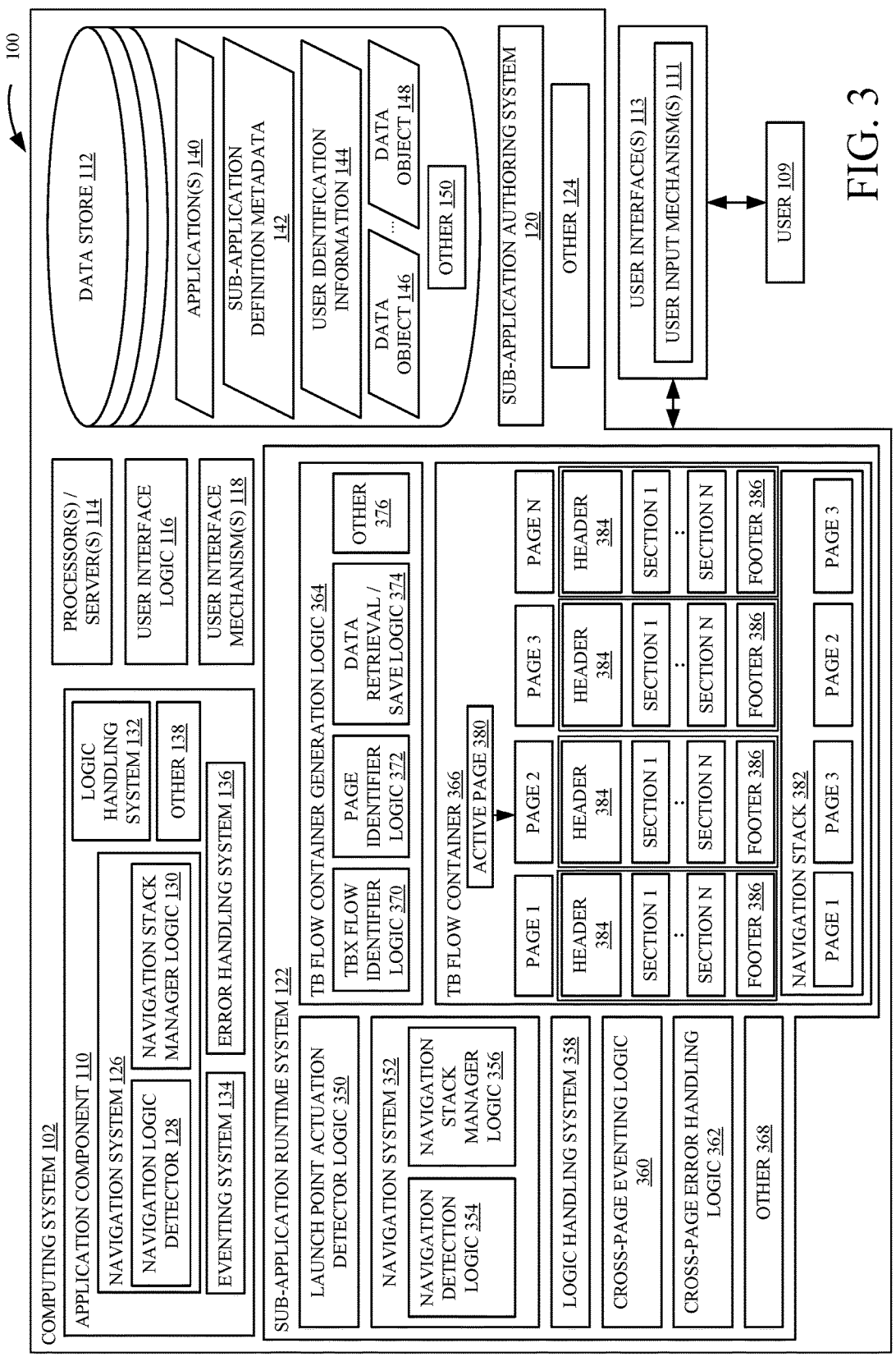
FIG. 3 is a block diagram showing the computing system illustrated in FIG. 1 with the sub-application runtime system shown in more detail.

As briefly mentioned above, sub-application authoring system 120 can be used by author 108 in order to configure or author one or more task-based sub-applications (or task-based flows) so that a user of computing system 102 can perform a task by using the task-based flow. Sub-application runtime application 102 illustratively runs the sub-applications, when they are launched from a parent application 140. FIG. 1 shows one example of sub-application authoring system 120 in more detail. FIG. 3 shows one example of sub-application runtime system 122 in more detail. Authoring a task-based flow is described first, and running one is described below.

Sub-application authoring system 120 illustratively includes page generation logic 152, launch point configuration system 154, error and event configuration system 155, sub-application linking system 156, sub-application storage logic 158, and it can include a wide variety of other items 160.

By way of overview, page generation logic 152 illustratively generates user interface displays, with user input mechanisms that can be actuated by author 108 in order to generate pages that can be displayed when the task-based flow is running. Launch point configuration system 154 illustratively generates user interface displays, with user input mechanisms, that allow author 108 to configure launch points within a parent application, where the user can launch the task-based flow, or where the task-based flow can be automatically lunched within the parent application. Sub-application linking system 156 illustratively generates user interface displays, with user input mechanisms, that allow author 108 to link a task-based flow that has just been authored, with one or more other task-based flows. By way of example, it may be that author 108 has just generated a task-based flow that allows a user to execute a task in order to pay an invoice. However, it may be that certain invoices need to be approved by the user's manager. Therefore, in one example, author 108 can configure the invoice payment task-based flow with branching logic that can be executed so that when a particular payment meets the conditions that require the payment to be authorized by the user's manager, then the logic automatically queues an approval request in an approval task-based flow for the user's manager. Examples of this will be described in greater detail below.

Sub-application storage logic 158 illustratively stores sub-application definition metadata 142, that defines the task-based flow that has just been authored, in data store 112. In doing so, it may link or otherwise associate the task-based flow with a given user or set of users or roles that will be allowed to run the task-based flow. For instance, logic 158 can store the sub-application definition metadata 142 and associate it with user identification information 144 that identifies the particular users or roles that will be allowed to run the task-based flow.

Figure 1A:
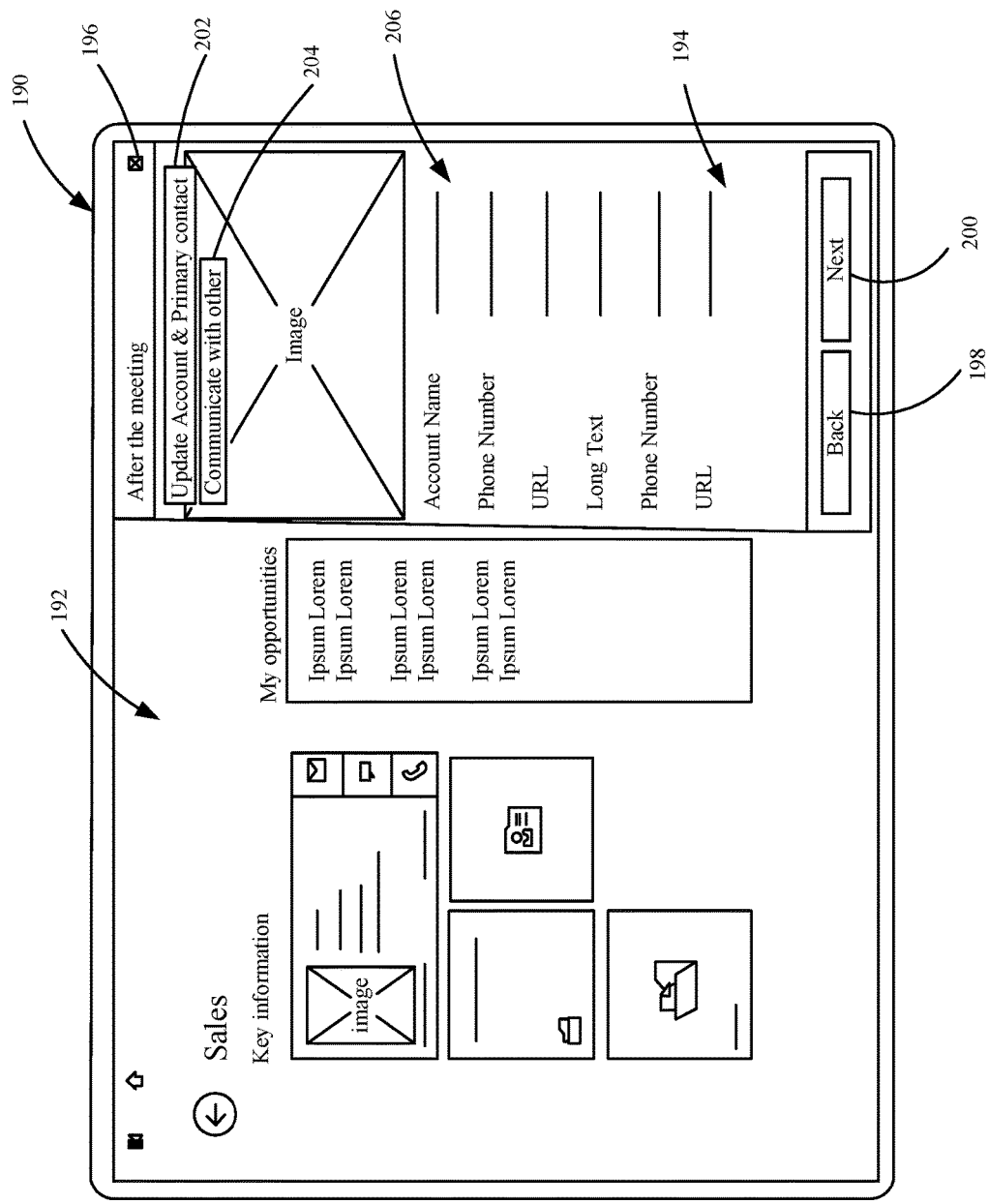
FIG. 1A shows one example of a task-based sub-application user interface display.

Again, by way of overview and prior to discussing how a task-based flow is authored and run, FIG. 1A shows one example of a mobile device 190 that can run a parent application 140 and a task-based flow (or sub-application) 142. It can be seen in FIG. 1A that mobile device 190 has generated a first user interface display 192 that may be generated by a parent application 140. From that user interface display, a user has launched a task-based flow (or it was automatically launched). The task-based flow then, when launched, generates user interface display 194.

In the example shown in FIG. 1A, the task-based flow that generates user interface display 194 is entitled "After the Meeting". It allows a user to perform a task, such as capture certain information about another party or organization, that was gained through a meeting. In the example shown in FIG. 1A, the user can capture an account name, one or more phone numbers or URLs, and the user can also enter a description of the meeting. In prior systems, the user may have been required to open multiple different forms within the parent application, in order to update objects or entities within the parent application, with the information. With the task-based flow, however, the user can simply enter that information on a single page of the task-based flow, and then navigate to additional pages in order to perform additional steps within the task, for capturing information after a meeting with another party or organization.

Display 194 may be generated as a pop-up or otherwise generated from within the parent application. User interface display 194 can have a variety of different controls. For instance, it can have a close control 196 that can be actuated to close the task-based flow. It can have a set of navigation controls 198 and 200 that can be used to navigate through various pages configured within the task-based flow. It can have other controls 202 and 204 that can be actuated to launch separate task-based flows. In addition, it can have a variety of fields 206 that can be edited by the user or actuated by the user, or otherwise interacted with, by the user.

Figure 1B:
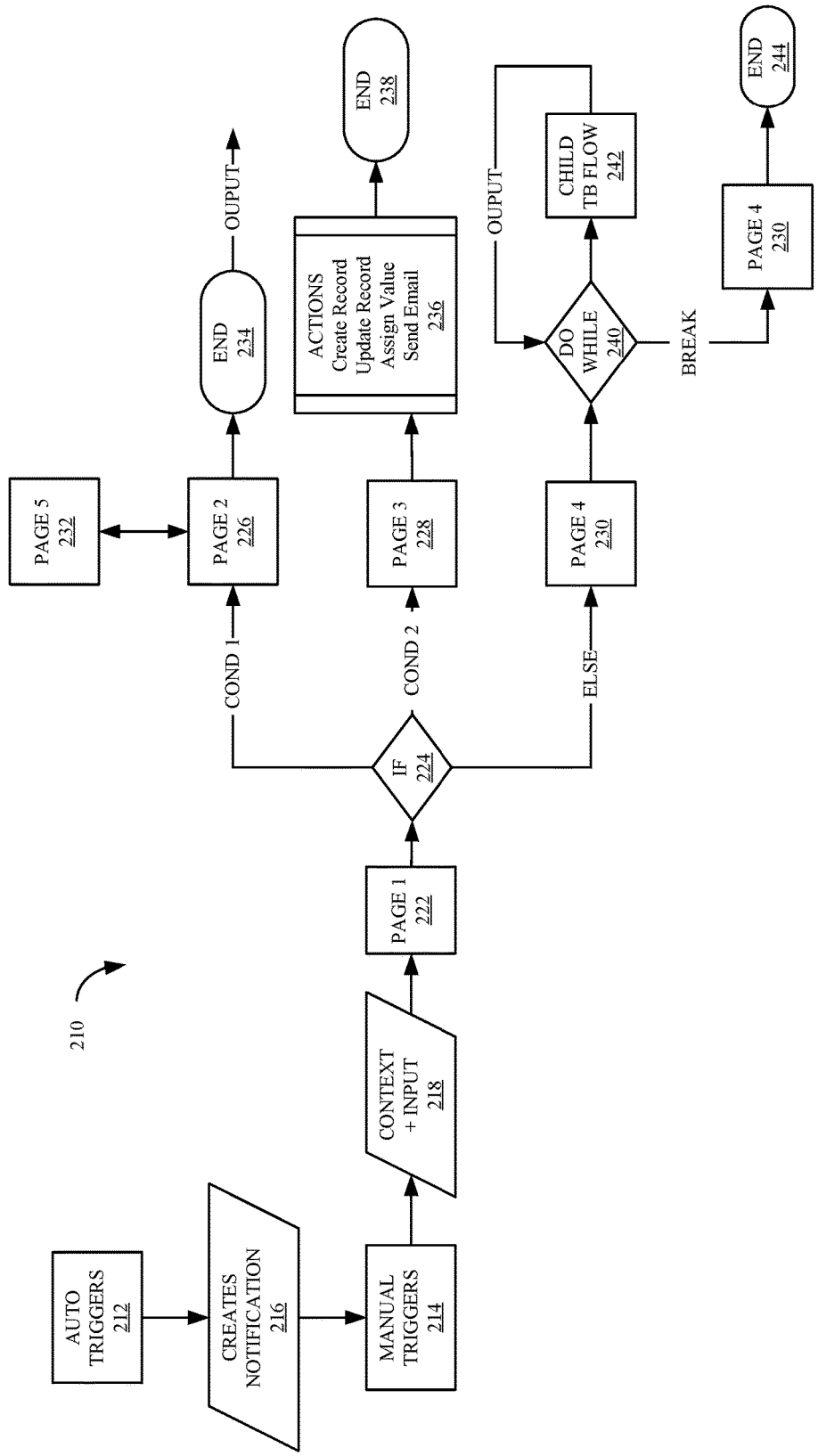
FIG. 1B is a flow diagram illustrating one example of the flow of a task-based sub-application.

FIG. 1B is a flow diagram corresponding to one example of a task-based flow 210. FIG. 1B is described as an example of one overall structure of a task-based flow, so that authoring a task-based flow (discussed below with respect to FIGS. 1 and 2) may be better understood. Flow 210 can be launched or triggered automatically by automatic triggers 212. Automatic triggers 212 may be event-based triggers or triggers generated from a client application programming interface (API) or otherwise. In addition, task-based flow 210 can be launched or triggered with a manual trigger 214. Manual trigger 214 can be actuated from a command bar in the parent application, from an interactive tile in the parent application, from a button or other user actuatable input mechanism in the parent application, etc. In addition in one example, the automatic trigger 212 generates a notification 216 which is placed in a notification queue in the parent application. The user can illustratively actuate or launch the task-based flow 210 from that notification. All of these, and other launch or trigger mechanisms are contemplated herein.

In the example shown in FIG. 1B, once a trigger is actuated, the user interface logic sends a context of the present application, and the actuation input, to sub-application runtime system 120, as indicated by block 218. Runtime system 122 then generates a first page 222 of the task-based flow 210, that has just been launched. Page 222 can take a wide variety of different forms. For instance, it may include bound controls, such as entity attributes, variables and process arguments, entity actions, etc. It can also include a set of free flow controls, such as buttons, lookup controls, label and progress bar controls, etc. In addition, the task-based flow 210 can have conditional or branching logic that is executed to navigate to different pages within task-based flow 210. For instance, as indicated by block 224, the logic in task-based flow 210 can evaluate a condition or set of conditions, based upon the inputs to, or control states on, page 222. The task-based flow need not be linear. Instead, if a first condition is found to be present at block 224, then a second page 226 can be displayed. If a second condition is found to be present, a third page 228 can be displayed, and otherwise, a fourth page 230 can be displayed. The user can then navigate to an additional page 232 from page 226, or the user can end the task-based flow as indicated by block 234.

From page 228, the user (or the task-based flow, itself) can perform an action 236 (such as create a record, update a record, assign a value, send an electronic mail message, etc.), and the task-based flow can then be completed as indicated by block 238.

From page 230, another task-based flow (e.g., a child task-based flow) can be launched from within task-based flow 210. This is indicated by blocks 240 and 242. When the child task-based flow 242 returns, task-based flow 210 can return to page 230, and then the task-based flow can be ended, as indicated by block 244.

It will be noted that the flow diagram shown in FIG. 1B is but one example of a configuration or structure for a task-based flow 210, and a wide variety of other configurations or structures can be used as well. For instance, a task-based flow can be configured to be linear, it can be configured to only be launched by automatic triggers 212 or manual triggers 214. It can be configured so that it does not launch a child task-based flow 242, or it can be configured in a wide variety of other ways.

Figure 2:
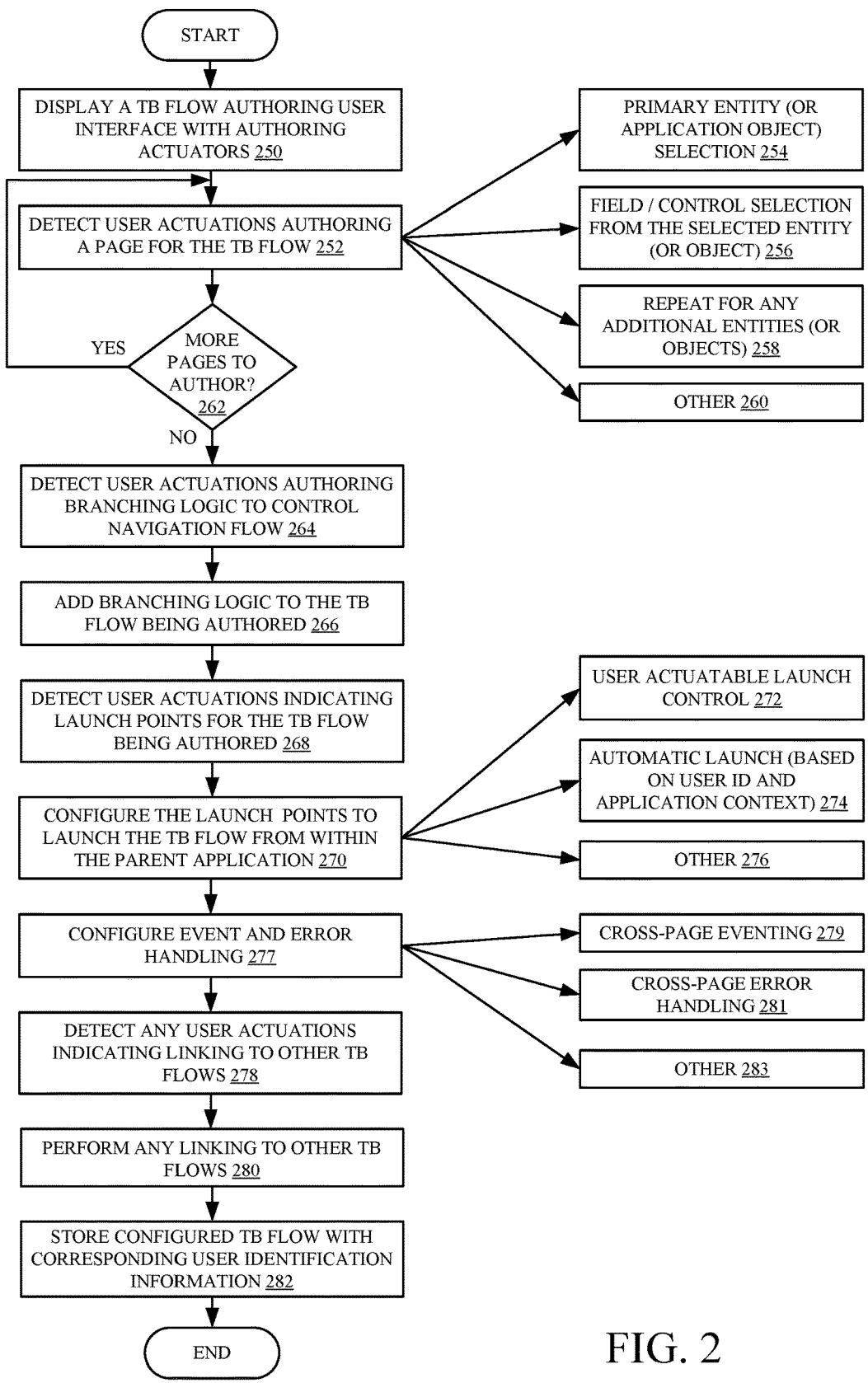
FIG. 2 is a flow diagram illustrating the overall operation of the computing system shown in FIG. 1 in allowing a user or developer to author a task-based sub-application.
Figure 2A:
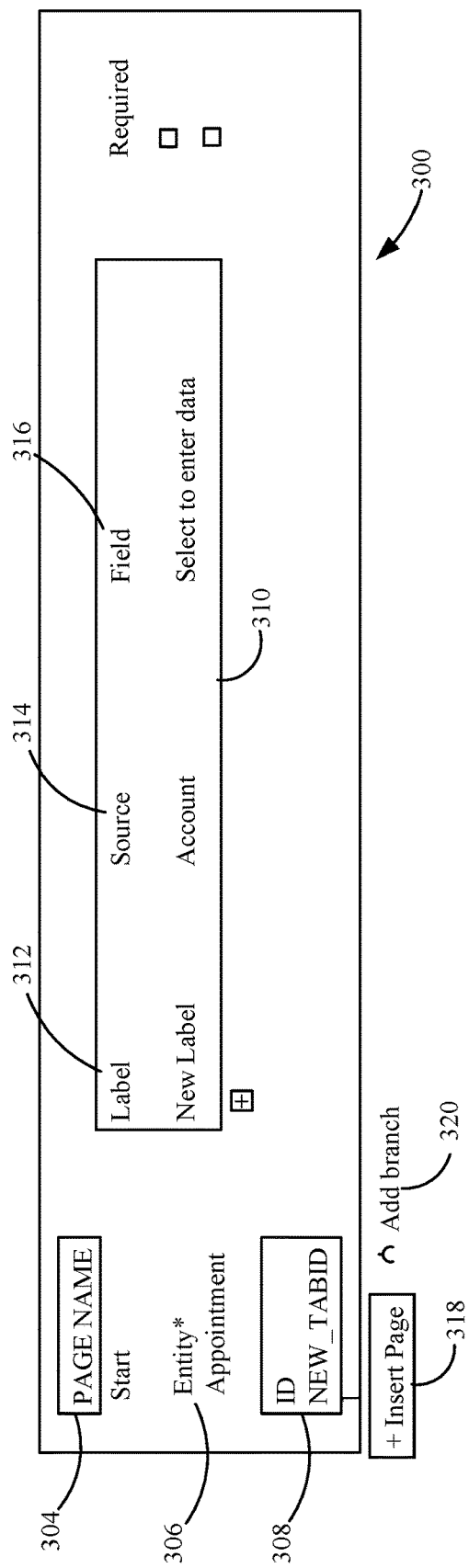
FIGS. 2A and 2B are examples of user interface displays that can be generated during the authoring process.
Figure 2B:
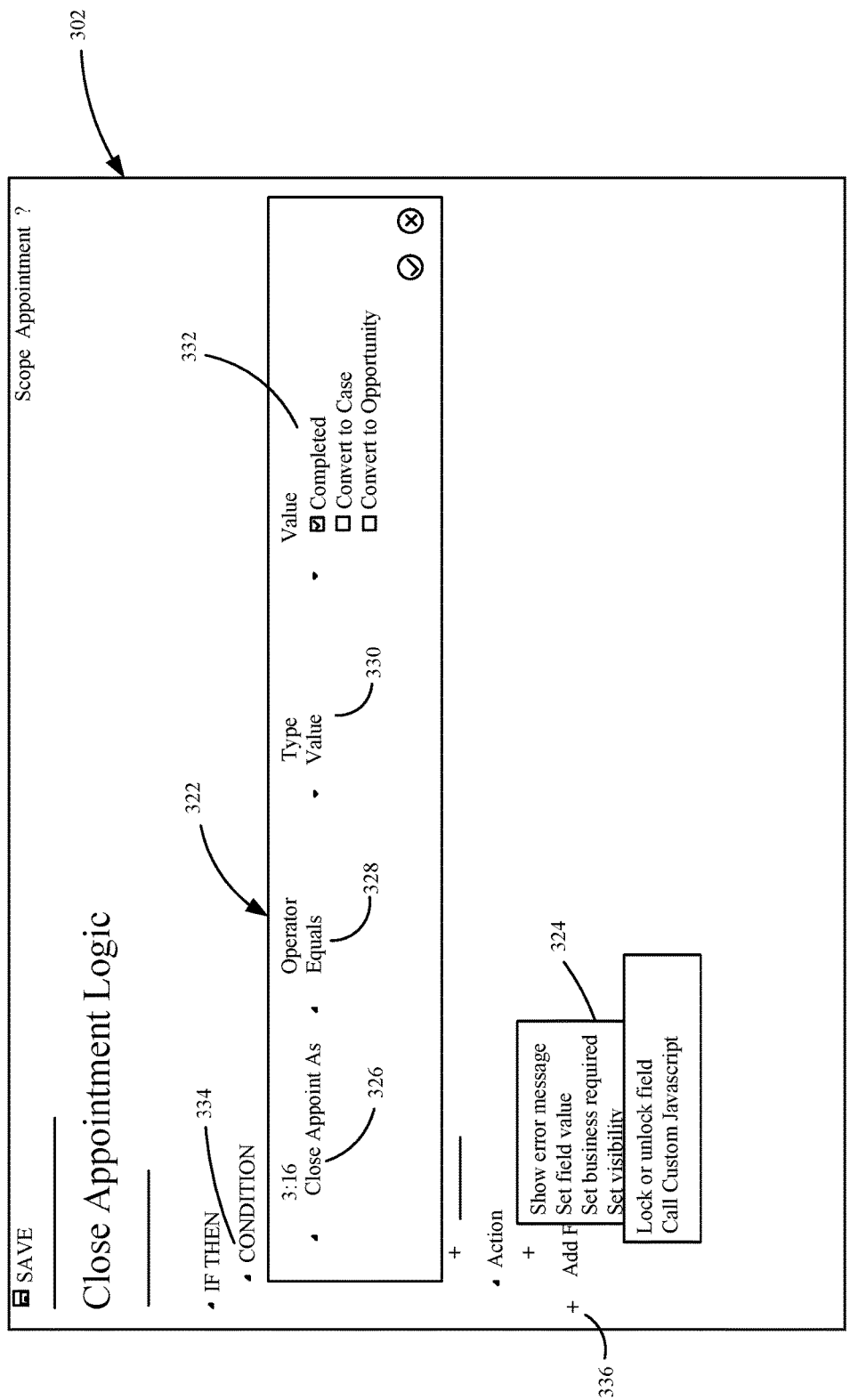

Returning again to the block diagram of FIG. 1, the operation of sub-application authoring system 120 in authoring a task-based flow will now be described in more detail. Page generation logic 152 illustratively includes entity selector mechanism 162, field selector mechanism 164, control selector mechanism 166, branching logic configuration mechanism 168, and it can include other items 170. Launch point configuration system 154 illustratively includes launch point identifier logic 172, parent application linking logic 174, and it can include other items 176. Sub-application linking system 156 illustratively includes sub-application identifier logic 178, link generator logic 180, and it can include other items 182. FIG. 2 is a flow diagram illustrating one example of the operation of authoring system 120. FIGS. 2A and 2B show examples of portions of user interface displays that can be generated during the authoring process. FIGS. 1, 2, 2A and 2B will now be described in conjunction with one another.

It is first assumed that author 108 first provides an input through a user authoring interface 104 indicating to sub-application authoring system 120 that user 108 wishes to author or otherwise modify a task-based flow (or sub-application). In response, system 120 uses user interface logic 116 to display a task-based flow (or TBX) authoring user interface 104 with authoring input mechanisms or actuators 106. Displaying the TBX authoring user interface 104 with authoring actuators 106 is indicated by block 250 in the flow diagram of FIG. 2. In general, a user first authors one or more pages that are to be displayed in the task-based flow. The user then illustratively authors branching logic that controls navigation among those pages, and the user then configures launch points from which the task-based flow can be launched within the parent application. The user can then illustratively link the task-based flow to any other task-based flows that have been authored. The linked task-based flow can be launched as a child of the task-based flow being configured. The author 108 can also configure error and event handling within the task-based flow being authored.

Page generation logic 152 thus detects user actuations authoring a page for the task-based flow. This is indicated by block 252. In order to do so, entity selector mechanism 162 illustratively displays an actuator that allows author 108 to select an entity (or application object) within the parent application. One of the entities or objects may be identified as a primary entity (or application object) that is selected for the task-based flow. This is indicated by block 254. Field selector mechanism 164 and control selector mechanism 166 illustratively generate user interface displays with user input mechanisms that can be actuated by author 108 in order to select various fields or controls from the selected entity that will be included on the current task-based flow page being authored. Author 108 can also provide inputs that control where the fields or controls are displayed on the current task-based flow page. Selecting fields or controls from the selected entity is indicated by block 256 in FIG. 2. Author 108 can repeat these steps (of selecting an entity or application object and selecting fields or controls from that application object that are to be displayed on the task-based flow page being generated) for any additional entities or application objects, as desired. This is indicated by block 258 in FIG. 2. Author 108 can use page generation logic 152 to author the page for the task-based flow in other ways as well, and this is indicated by block 260.

Once a current page for the task-based flow has been authored, the user can also repeat this process for additional pages that are to be displayed within the task-based flow. The user can provide additional page names and/or page identifiers for the additional pages, the user can select entities or application objects and fields or other controls on those entities or application objects, that are to be included on the page. Repeating these steps is indicated by block 262 in FIG. 2. This can be done until all pages for the task-based flow are authored.

Branching logic configuration mechanism 168 also illustratively generates user interfaces with user input mechanisms that can be actuated by author 108 in order to configure branching logic that can be used to navigate through the various pages that have been generated for the task-based flow being authored. Mechanism 168 illustratively detects user actuations of those actuators and adds branching logic to the task-based flow, based upon those user inputs. Detecting the user authoring inputs indicative of branching logic to be configured, and adding that branching logic to the task-based, flow is indicated by blocks 264 and 266 in FIG. 2.

At this point in the flow diagram of FIG. 2, author 108 has authored a set of pages that are to be displayed for the task-based flow, and has also authored or configured the branching logic that is used to navigate among those pages. Author 108 now illustratively uses launch point configuration system 154 to configure launch points, from which the task-based flow can be launched within the parent application. Thus, launch point identifier logic 172 illustratively generates a user interface with a user input mechanism that allows author 108 to identify points in the parent application from which the task-based flow can be launched. Detecting user actuations of those inputs and configuring the launch points to launch the task-based flow from within the parent application are indicated by blocks 268 and 270 in the flow diagram of FIG. 2. In one example, the launch points can be user actuatable launch controls which, when actuated by the user, launch the task-based flow from within the parent application. This is indicated by block 272. In another example, the launch points can automatically launch the task-based flow based upon a context of the parent application, and based upon user identification information indicative of the user that is interacting with the parent application. This is indicated by block 274. It will be noted that the automatic launching of the task-based flow can be done in a completely automated way, without any user input, or it can be configured so that it generates a notification to the user and the user can launch the task-based flow, or at least authorize the task-based flow to be launched, based upon the automatically generated notification. The launch points can be configured in other ways as well, and this is indicated by block 276. Parent application linking logic 174 then links the task-based flow to the parent application, through the launch points that have just been configured.

As discussed above, some task-based flows can be linked to other task-based flows so that the other task-based flows are launched as child flows from within the original task-based flow. Sub-application identifier logic 178 illustratively generates user interfaces, with user input mechanisms that can be actuated by author 108 to identify a child task-based flow that is to be launched (or otherwise linked to) from within the task-based flow that is currently being authored. Detecting actuation of those user inputs to identify the child task-based flow to be linked to the present task-based flow is indicated by block 278 in FIG. 2. Based upon those user inputs, link generator logic 188 illustratively links the child flow to the current task-based flow being authored. This is indicated by block 280.

Error and event configuration system 155 then exposes user interfaces with user input mechanisms that can be actuated by author 108 in order to configure event and error handling within the task-based flow. This is indicated by block 277 in FIG. 2. In one example, system 155 generates user input mechanisms that can be actuated in order to configure cross-page eventing and cross-page error handling in the task-based flow. This is indicated by blocks 279 and 281 in FIG. 2. For instance, the task-based flow can be configured so that when an event occurs on one page in the task-based flow, controls on other pages in the task-based flow will be notified of that event, if they have subscribed to receive such a notification. Similarly, it may be that an error on one page also causes an error on other pages in the task-based flow. In one example, both the events and errors can be handled in a cross-page manner, depending on how they are configured with system 155, when the task-based flow is authored. The event and error handling can be configured in other ways as well, and this is indicated by block 283. Sub-application storage logic 158 then stores the configured task-based flow (or the metadata representative of that flow) with corresponding user identification information that identifies a user or role that can launch the task-based flow. This is indicated by block 282.

It will also be noted that the order of authoring can be different from that described above. For instance, the launch points may be configured first, or the branching logic may be configured after the launch points. These are examples only.

FIGS. 2A and 2B show examples of two different portions of user interface displays that can be generated by sub-application authoring system 120, so that author 108 can author a task-based flow. FIG. 2A shows a portion of a user interface display 300 that can be used to configure a page in a task-based flow, and FIG. 2B shows a portion of a user interface display 302 that can be used to configure branching logic that is executed in the task-based flow. In FIG. 2A, a page name control 304 allows the user to name the page. Control 304 can be a text box or other user input mechanism. Entity selector 306 allows the user to select a primary or secondary (or other) entity from which fields or other controls are to be used in generating the current page. Identification control 308 allows the user to select or input an identifier for the page, and attribute/label portion 310 includes controls that allow the user to input or select labels or attributes for the page. For instance, a label control 312 allows the user to input or select a label. A source control 314 allows the user to input or select a source of data, and a field control 316 allows the user to enter data into a field.

User interface display 300 also includes an insert page control 318 and an add branch control 320. The user can include additional pages in the task-based flow by actuating control 318. This takes the user to another page generation user experience where the user can generate another page. If the user actuates the add branch control 320, the user is navigated to a logic configuration experience where the user can configure branching logic in the task-based flow.

User interface display 302 in FIG. 2B shows that branching logic configuration mechanism 168 (in FIG. 1) exposes various controls that can be actuated by author 108 to configure branching logic. In the example shown in FIG. 2B, the branching logic to be configured is in the form of an "if-then" statement. Control 322 allows author 108 to specify a condition for the statement, and control 324 allows the author 108 to select or otherwise identify an action to be taken if the condition is met. In the condition configuration control 322, the user can specify a field 326, an operator 328, a type 330 of the condition, and a particular value 332 for that type of condition. In the example, it can be seen that the condition has been set to be met if the field "Close Appointment" is equal to a value of "Completed". Then, an action specified using control 324 is to be taken. FIG. 2B shows an example in which control 324 is a drop down menu, but it could be others controls as well. In addition, the user interface display 302 in FIG. 2B includes controls 334 and 336 which can be actuated to add additional conditions or additional actions, respectively. Again, the examples shown in FIGS. 2A and 2B are examples only, and a wide variety of other authoring user interface displays, with authoring user input mechanisms, can be used.

FIG. 3 is a block diagram of architecture 100, which is similar to that shown in FIG. 1, and similar items are similarly numbered. However, FIG. 3 shows sub-application runtime system 122, in more detail, and a user 109 can use user input mechanism 111 on interfaces 113 to run a sub-application (or task-based flow). FIG. 3 shows that, in one example, sub-application runtime system 122 includes launch point detector logic 350, navigation system 352 (which itself, can include navigation detector logic 354 and navigation stack manager logic 356), logic handling system 358, cross-page eventing logic 360, cross-page error handling logic 362, or task-based flow container generation logic 364, a TB (or task-based) flow container 366, and it can include other items 368. Generation logic 364 can include task-based (or TB) flow identifier logic 370, page identifier logic 372, data retrieval logic 374, and other items 376. The container 366 illustrated in FIG. 3 includes a set of pages labeled pages 1, 2, 3 and N. In addition, an active page indicator 380 points to an active page within container 366. A navigation stack 382 shows the pages that have been navigated to in the task-based flow represented by container 366. Thus, it can be seen that the flow has navigated to pages 1, 3, 2 and then back to 3, in that order.

Each page includes a header 384, a set of sections labeled section 1-section N, and a footer 386. Some examples of pages have been discussed in more detail above with respect to FIGS. 1A and 1B. Before describing the operation of sub-application runtime system 122 in more detail, an overview of some of the items in system 122, and their operation, will first be provided.

Launch point actuation detector 350 detects that a launch point in the parent application has been actuated. Again, it can be automatically or manually actuated, and indicates that the corresponding task-based flow is to be run. Container generation logic 364 then uses flow identifier logic 370 to identify which particular task-based flow is to be launched. Page identifier logic 372 identifies the particular page that is to be displayed first for that task-based flow, and data retrieval logic 374 retrieves the data and populates the page to be displayed. Using this information, logic 364 generates task-based flow container 366. It includes containers for various pages 1-N which are in the task-based flow, and it sets the active page indicator 380 to the active page. It then controls user interface logic 116 to display the active page (such as in a pop-up or otherwise) within the parent application.

Navigation system 352 controls the navigation stack 382 so that the proper page is displayed, based upon the various navigation inputs that can be received. Navigation detector logic 354 detects a navigation input (such as the user pressing the "next" or "back" buttons on the displayed page, or other navigation inputs) and navigation stack manager logic 356 identifies which page is to be displayed next and loads information for that page.

Logic handling system 358 handles (such as executes) any logic on (or corresponding to) the displayed page. It can also handle the branching logic which determines which page is to be displayed next, in the task-based flow. This information can be provided to navigation stack manager logic 356 which loads information for the next page to be displayed, and navigates the user to that page.

Cross-page eventing logic 360 handles any cross-page eventing that has been configured for the task-based flow. If an event occurs on one page of the task-based flow, another page or a control on another page may have registered to receive a notification of that event. Cross-page eventing logic handles these types of registrations and notifications.

Cross-page error handling logic 362 handles any cross-page error messages or error processing that is to be performed. By way of example, if a particular value is entered on a page being displayed, this may cause an error on a page that may be displayed in the future, on a page that was displayed in the past, or a page that may not be displayed in the current instance of the task-based flow.

Figure 4:
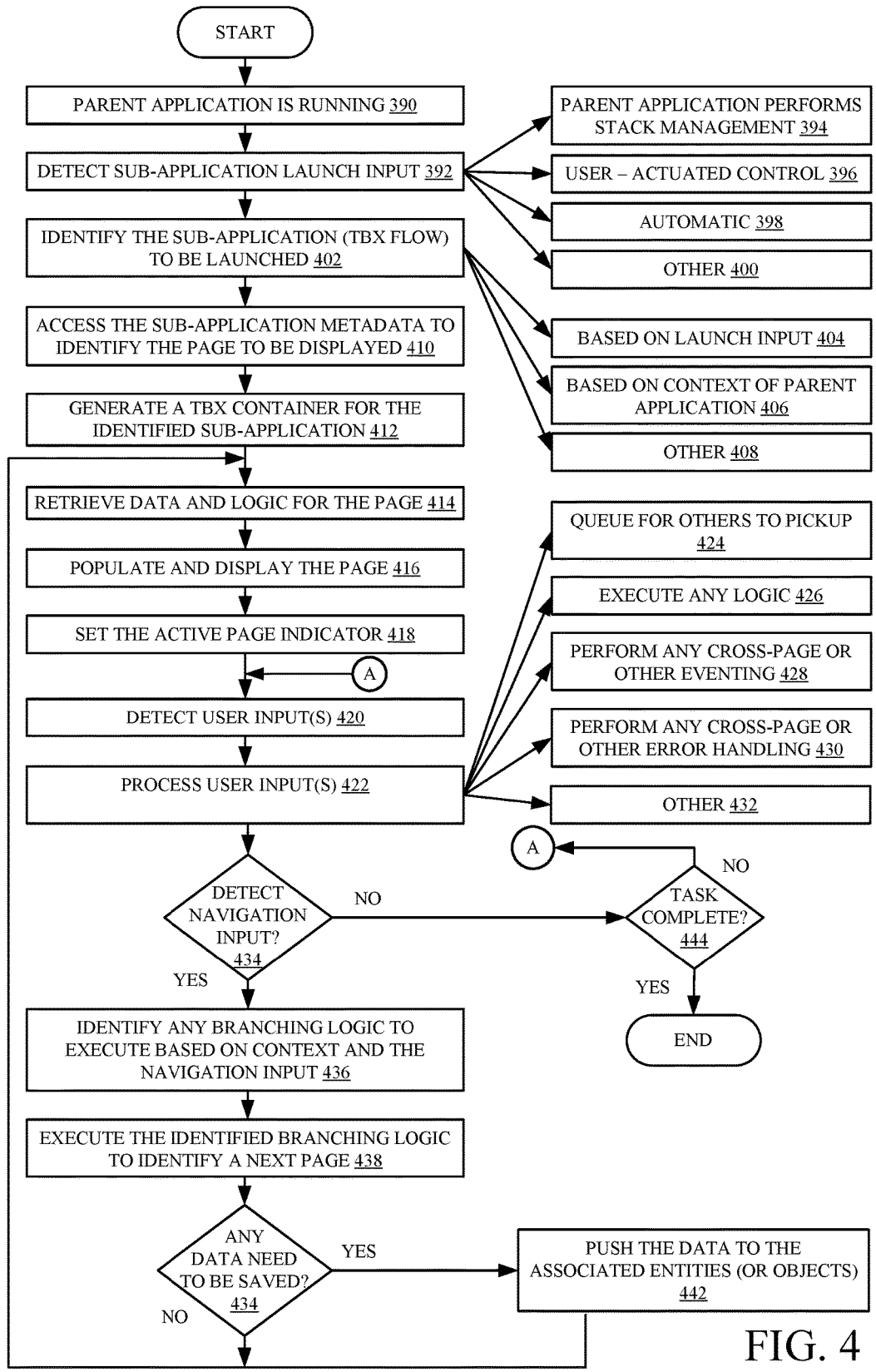
FIG. 4 is a flow diagram illustrating the operation of the computing system illustrated in FIG. 3, during runtime operation of a task-based sub-application.

FIG. 4 is a flow diagram illustrating one example of the operation of sub-application runtime system 122, in more detail. It is first assumed that the parent application, from which the task-based flow will be launched, is running in computing system 102. This is indicated by block 390 in FIG. 4.

At some point, launch point actuation detector 350 will detect a task-based flow launch input that indicates that a task-based flow should be launched within the parent application. This is indicated by block 392. It will be noted that, in one example, navigation system 126 in the parent application performs stack management for the parent application. This is indicated by block 394. Navigation system 352 can also perform navigation management for the task-based flow, within the parent application. Therefore, it can maintain its own navigation stack and perform its own stack management, even while navigation system 126 in the parent application is performing its stack management. In doing so, it may open the task-based flow in a pop-up, or another view, within the parent application.

It will also be noted that, in one example, the launch point is user actuated. This is indicated by block 396. It can also be automatically actuated as indicated by block 398. The sub-application (or task-based flow) launch input can be received in other ways as well, and this is indicated by block 400.

Flow identifier logic 380 then identifies the particular task-based flow or sub-application to be launched. This is indicated by block 402. The identity of that task-based flow can be included in the launch input, as indicated by block 404. It can also be based on a context of the parent application. For instance, the context of the parent application may, itself, identify or indicate which particular task-based flow is to be launched. This is indicated by block 406. The identity of which particular task-based flow to launch can be identified in other ways as well, and this is indicated by block 408.

Page identifier logic 372 then accesses the sub-application definition metadata for the identified task-based flow to determine which particular page of that flow is to be displayed first. Identifying the page is indicated by block 410 in FIG. 4. Container generation logic 364 then generates a task-based flow container 366 for the identified sub-application (or task-based flow). This is indicated by block 412. Data retrieval logic 374 illustratively retrieves data and logic for the first page to be displayed. This is indicated by block 414. It will also be noted that data for more than just the first page may be retrieved to reduce navigation latency or for other reasons. It populates and displays that page to the user, as indicated by block 416. It also illustratively sets the active page indicator 380 to indicate which particular page is active (or is currently being displayed). This is indicated by block 418.

At that point, logic handling system 358 simply waits to determine whether any user inputs are received. At some point, a user input will be detected on the displayed page. This is indicated by block 420. Logic handling system 358 (or other items in sub-application runtime system 122) then processes that user input. This is indicated by block 422. For instance, if the task-based flow is one which calls a child task-based flow, then it may queue a request for that child flow to be picked up by another user or another system. This is indicated by block 424. It may execute any logic that is configured for the displayed page, or otherwise, in the task-based flow. This is indicated by block 426. Cross-page eventing logic 360 and cross-page error handling logic 362 can perform any cross-page eventing or error handling. This is indicated by blocks 428 and 430, respectively. The user inputs can be handled or processed in a wide variety of other ways as well, and this is indicated by block 432.

It may be that navigation detector logic 354 detects a navigation input. For instance, it may be that the user has actuated the "next" or "back" buttons on the displayed page. It may be that the user has actuated another control that will navigate the user to a page which is out of a linear sequence in the task-based flow, or which launches another task-based flow. It may be that a navigation input is automatically generated, based upon other user or system actions. All of these are contemplated herein. Detecting a navigation input is indicated by block 434 in FIG. 4.

Logic handling system 358 then identifies any branching logic that is to be executed, based upon the navigation input, and based upon the context of the task-based flow. For instance, it may be that the user has changed control states on the displayed page to a first value and actuated the "next" button. In that case, there may be conditional logic that navigates the user to another page in the task-based flow. However, if the user had changed the control states to a second value, then the branching logic may point to a different next page. Identifying any branching logic and executing the branching logic to identify the next page is indicated by blocks 436 and 438 in FIG. 4.

When the user navigates away from a page in the task-based flow, it may be that some data that was entered on that page needs to be saved. This is indicated by block 440. If so, then data retrieval/save logic 374 pushes that data back to the appropriate entities in the application. For instance, as discussed above, a page in the task-based flow may include fields from a plurality of different entities (or application objects). If the user changes data in any of those fields, then logic 374 identifies the particular entity from which the field was retrieved (or the underlying table entries in data store 112) and stores the modified data in the identified locations. This is indicated by block 442 in FIG. 4. Then, data retrieval/save logic 374 retrieves data for the next page that was identified in response to receiving the navigation input, and that page is populated and displayed as indicated by blocks 414 and 416, and processing continues at that point in the task-based flow.

At some point, the task represented by the task-based flow, or the task-based flow itself may be closed by the user or by the system. This is indicated by block 444 in FIG. 4.

Figure 5:
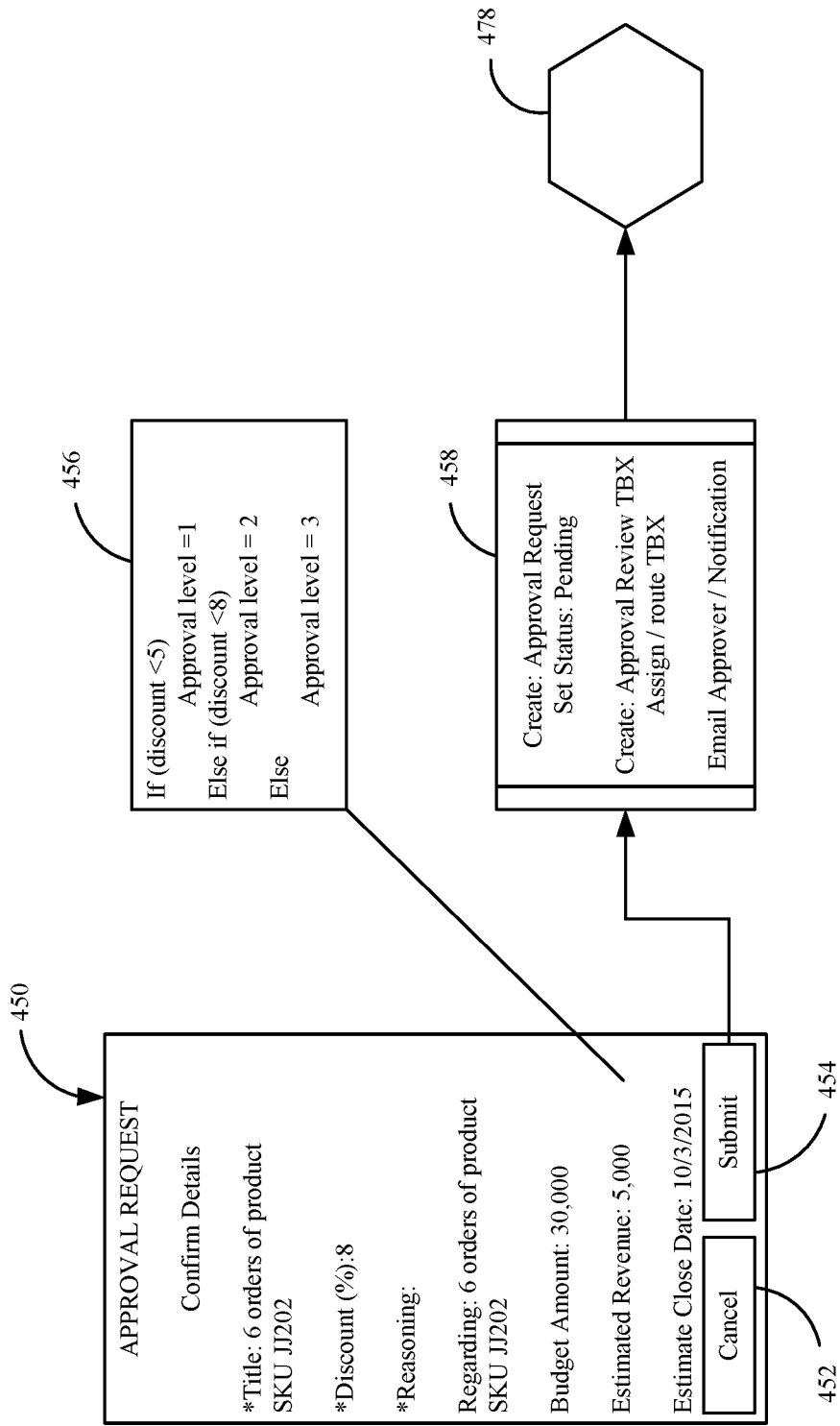
FIGS. 5 and 6 are flow diagrams, with corresponding user interface displays, showing the operation of one example of a task-based sub-application and a child task-based sub-application.
Figure 6:
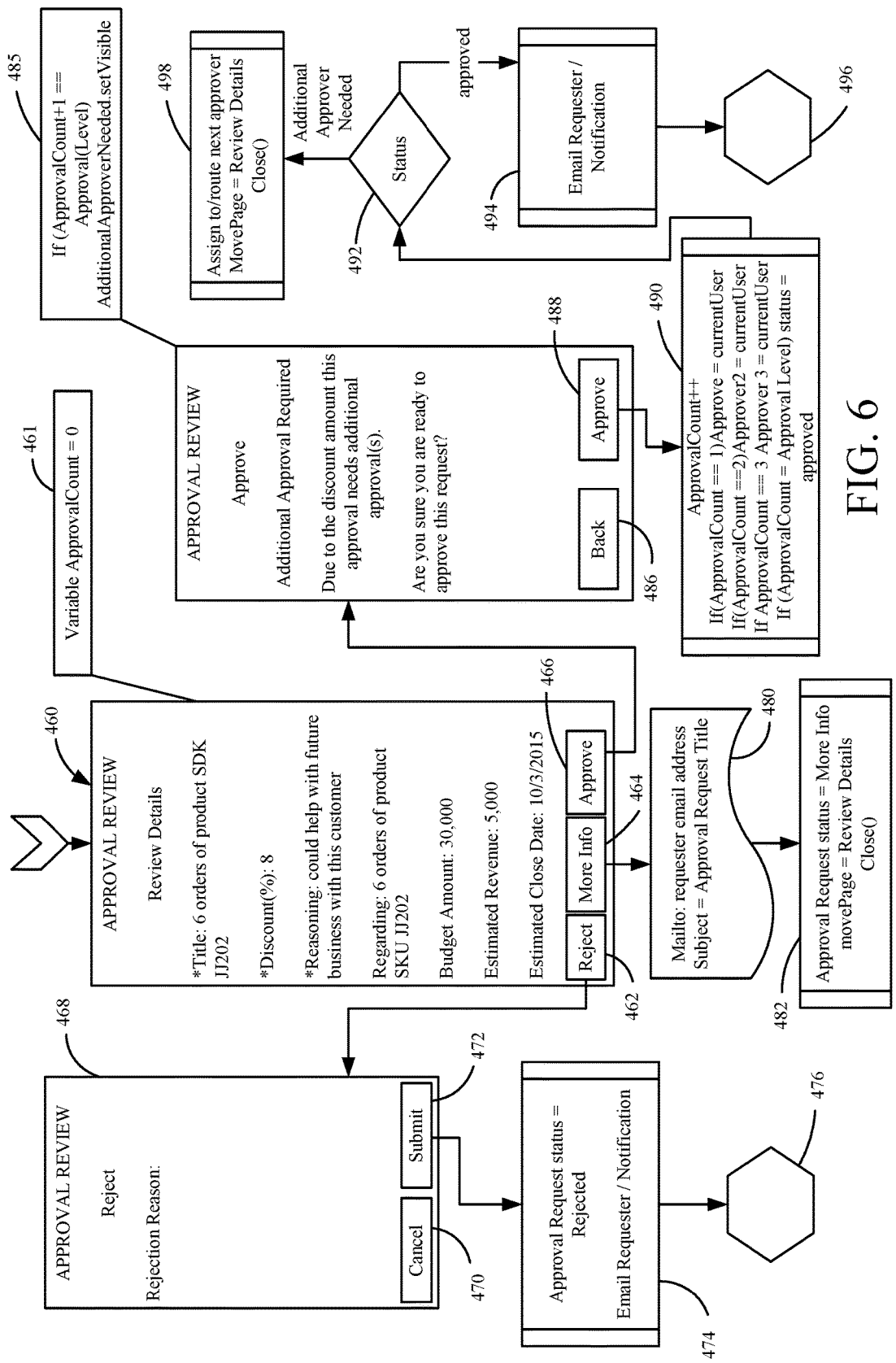

FIGS. 5 and 6 show a set of flow diagrams that include examples of user interface displays that can be generated during a task-based flow, along with arrows indicating how the task-based flow advances given its branching logic. FIGS. 5 and 6 will now be described in conjunction with another.

FIG. 5 shows that, in one example, a task-based flow, for performing a task of submitting an approval request, is first launched. A user interface display, such as display 450 can be displayed. Display 450 shows a set of fields that can be edited by the user, and specify information relating to a quote that is to be sent for ordering a set of products. User interface display 450 also includes a set of actuators 452 and 454 that allow the user to submit the quote for approval, or to cancel the quote.

Block 456 identifies the particular branching logic that is used to determine what will happen when the user actuates the submit actuator 454. The branching logic is specified in the "if-then" format and identifies three different approval levels, based upon values entered in the fields in user interface display 450. When the user actuates the submit actuator 454, logic handling system 358 evaluates that "if-then" statement and identifies an approval level that is needed. It then sets a status for the approval request task-based flow to pending. System 358 also requests another task-based flow to be run (the "approval review" flow), as a child of the approval request flow. This action is indicated by block 458 in FIG. 5. The request to have the "approval review" flow run is then queued for a particular manager or other person who needs to review the quote.

When that manager launches the "approval review" task-based flow, a user interface display, such as display 460 shown in FIG. 6, is displayed for that manager. In addition, as is described below, it may be that more than one person needs to approve the request. Therefore, block 461 indicates that logic handling system 358 performs a step of setting a counter (ApprovalCount) to zero.

Display 460 shows that the terms of the quote are displayed, along with three actuators. A "reject" actuator 462 can be actuated to reject the approval. A "more info" actuator 464 can be actuated to request more information about the approval request, and the "approve" actuator 466 can be actuated to approve the request. Each of these navigates differently within the "approval review" task-based flow.

If the manager actuates the "reject" actuator 462, then the navigation system 352 displays for the manager a next page, such as page 468, in the "approval review" task-based flow. Page 468 provides a control that allows the manager to enter reasons that the approval was rejected, along with a set of actuators 470 and 472 that the manager can actuate to either go back to page 460, or to actually send a rejection of the request, respectively. If the manager actuates the reject actuator 472, then the status of the approval request set in block 458 of FIG. 5 is now set to "rejected" and the requestor that requested the approval is notified (such as by e-mail or by other notification). This is indicated by block 474. Processing then returns to the task-based flow illustrated by blocks 476 and 478 in FIG. 5, at which point both the child task-based flow represented in FIG. 6 and the parent task-based flow represented in FIG. 5 are terminated.

Returning again to the user interface 460 in FIG. 6, if the manager actuates the "more info" actuator 464, then logic handling system 458 sends an electronic mail message, or other message, to the requestor, requesting more information. This is indicated by block 480. The status of the request is then set to "more information requested". This is indicated by block 482.

If, at the user interface display 460, the manager actuates the "approve" actuator, then navigation system 352 identifies the "approve" page 484 as the next page to be displayed. Logic handling system 358 adds one to the ApprovalCount counter because the present manager actuated the "approve" actuator. Page 484 also has logic that is evaluated to determine whether additional approvals are needed for the approval request. In FIG. 6, the logic indicates that additional approvals will be needed, based upon values entered in display 460 (e.g., based upon the discount being 8%).

In one example, the manager can also be provided on display 484 with actuators 486 and 488. If the manager actuates actuator 488, then logic handling system 358 executes logic that calculates the number of approvals that have been received to determine whether the request is now approved, or whether it needs additional approvals. This is indicated by block 490. Then, as indicated by block 492, if a sufficient number of approvals have been received, the requestor is notified (such as through an electronic mail message or other notification) that the request has been approved. This is indicated by block 494. Again, the task-based flow illustrated in FIG. 6 returns to that illustrated in FIG. 5 as indicated by blocks 496 and 478 in FIG. 6 and FIG. 5, respectively.

However, if, at block 492, it is determined that additional approvals are still needed, then the approval request is assigned to yet another approver (e.g., another manager) as indicated by block 498. This can be done by queuing the approval request as a task-based flow for the additional approver, and waiting for the results of that task-based flow to be returned.

It can thus be seen that the present system displays pages in a task-based flow. The pages can include fields or controls from a plurality of different entities, so that those fields or controls can be displayed, and interacted with, so a user can perform a task without retrieving and surfacing the forms that represent all of those underlying application objects (or entities). This significantly saves round trips from the computing system to the data store, and thus reduces time and computing overhead needed to perform a task. The sub-application runtime system maintains its own navigation control and navigation stack, on top of that maintained for the parent application, from which the task-based flow was launched. The sub-application runtime system also performs cross-page event handling and error handling, within the task-based flow. Again, because this is done on the pages of the task-based flow, it does not involve retrieving and materializing forms that represent the underlying application objects (or entities). This also significantly reduces the latency, computing overhead, and network bandwidth needed for round trips to the data store.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
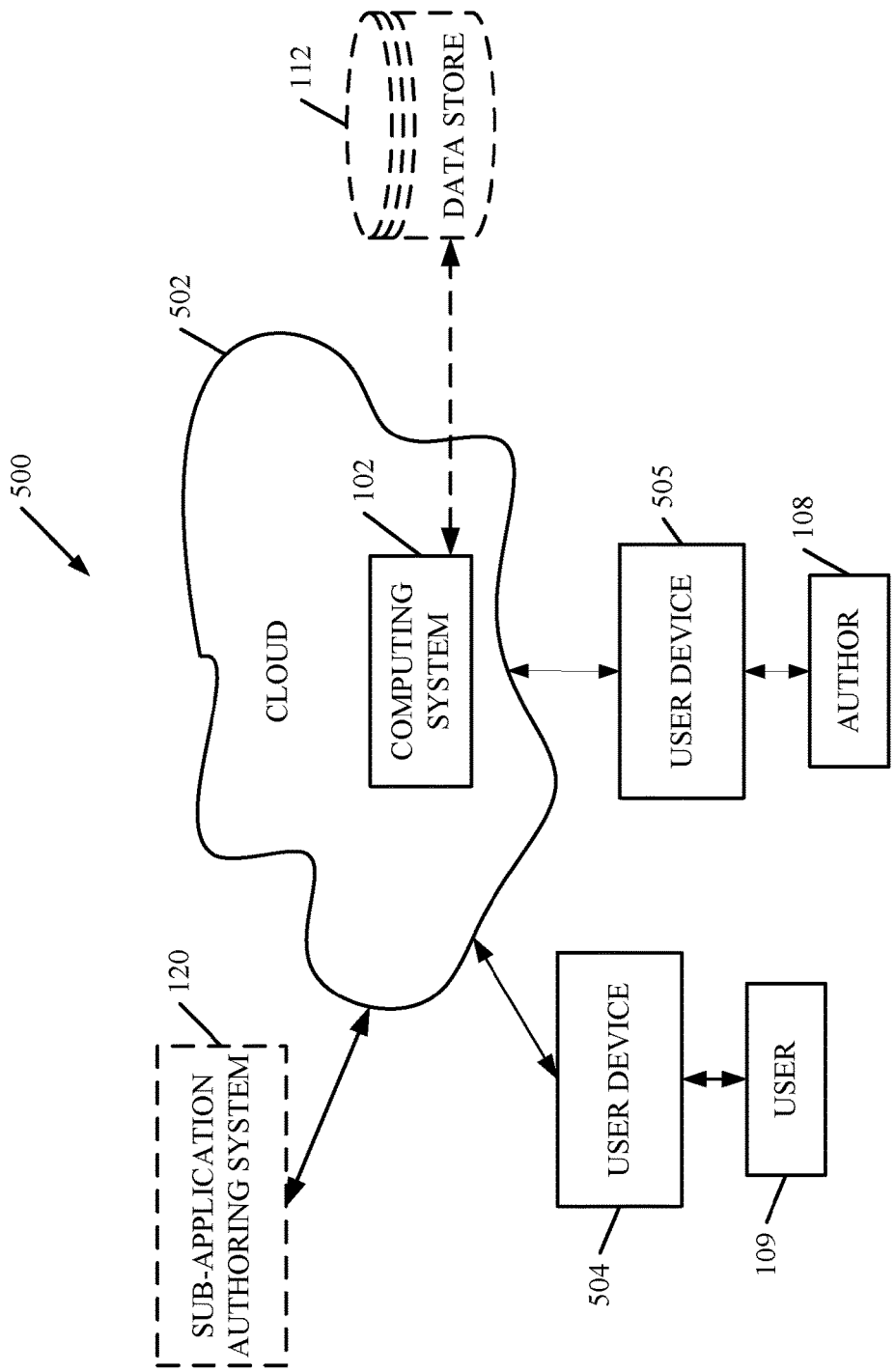
FIG. 7 is a block diagram of the computing system illustrated in FIGS. 1 and 3 above, deployed in a cloud computing architecture.

FIG. 7 is a block diagram of architecture 100, shown in FIGS. 1 and 3, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIGS. 1 and 3 and they are similarly numbered. FIG. 7 specifically shows that computing system 102 can be located in cloud 502 (which can be public, private, or a combination where portions are public while others are private). Therefore, author 108 or user 109 uses a user device 504 or 505 to access those systems through cloud 502.

FIG. 7 also depicts another example of a cloud architecture. FIG. 7 shows that it is also contemplated that some elements of computing system 102 are disposed in cloud 502 while others are not. By way of example, data store 112 can be disposed outside of cloud 502, and accessed through cloud 502. In another example, sub-application authoring system 120, or other systems or logic, can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
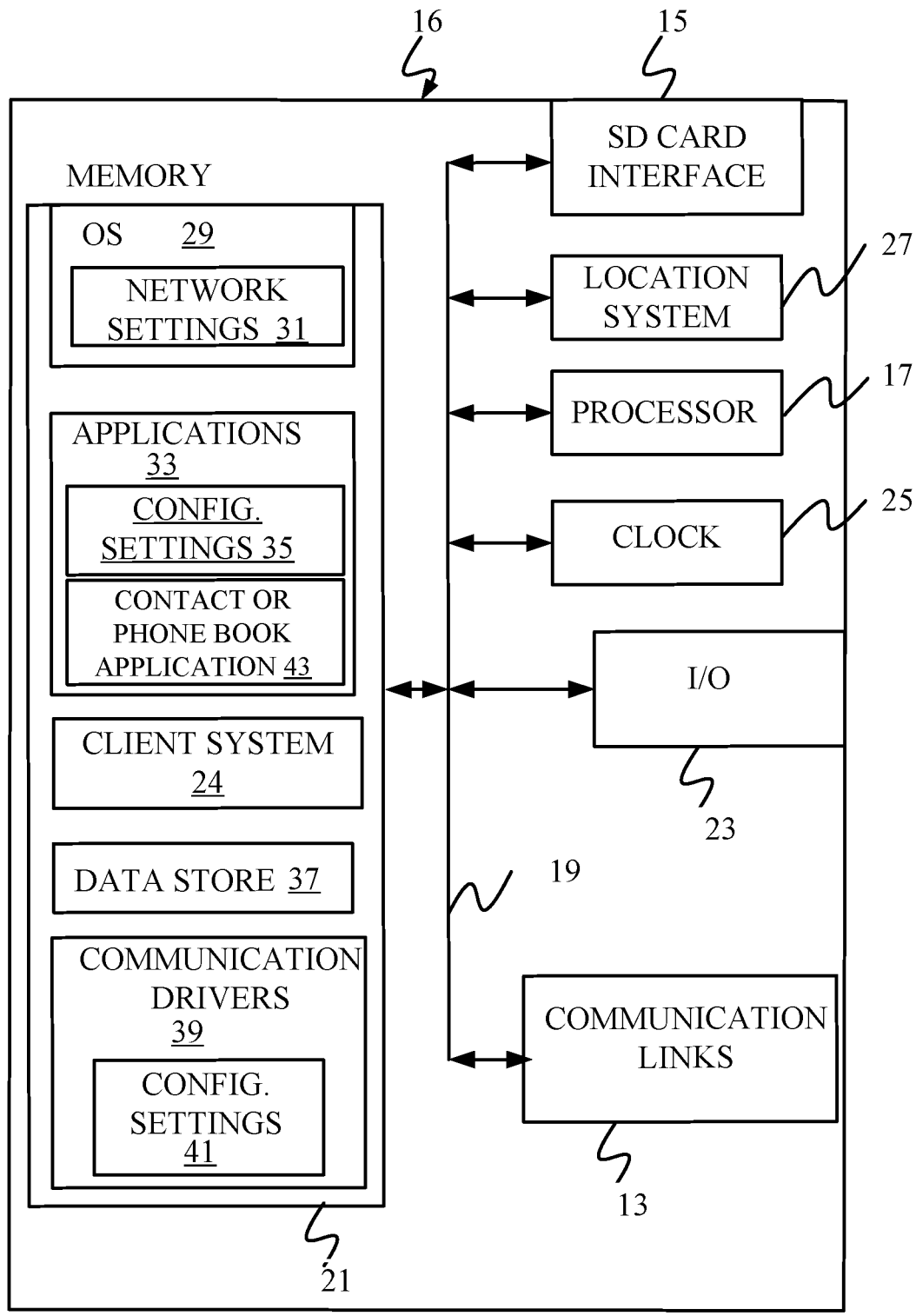
FIGS. 8-10 show examples of mobile devices.
Figure 9:
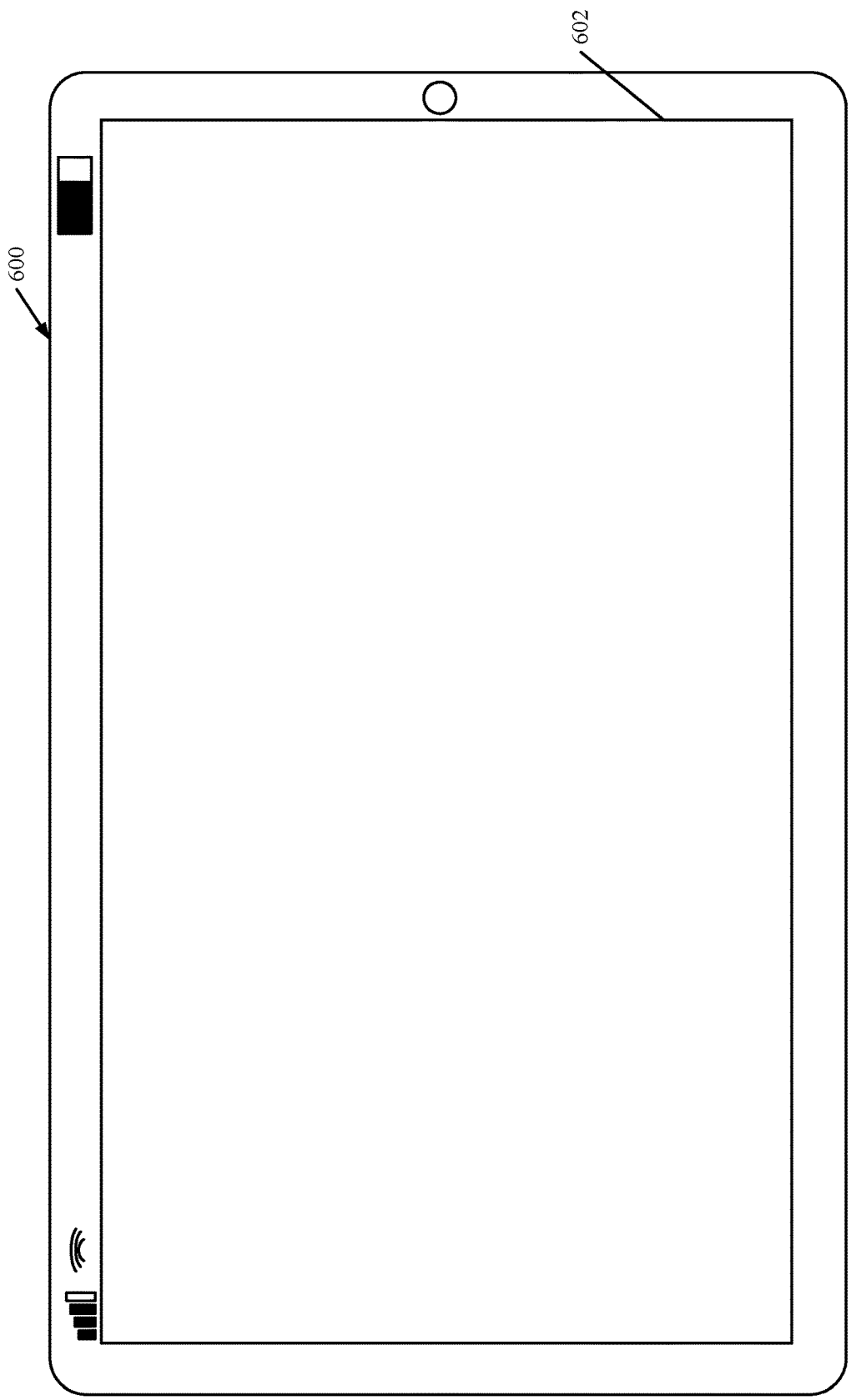
Figure 10:
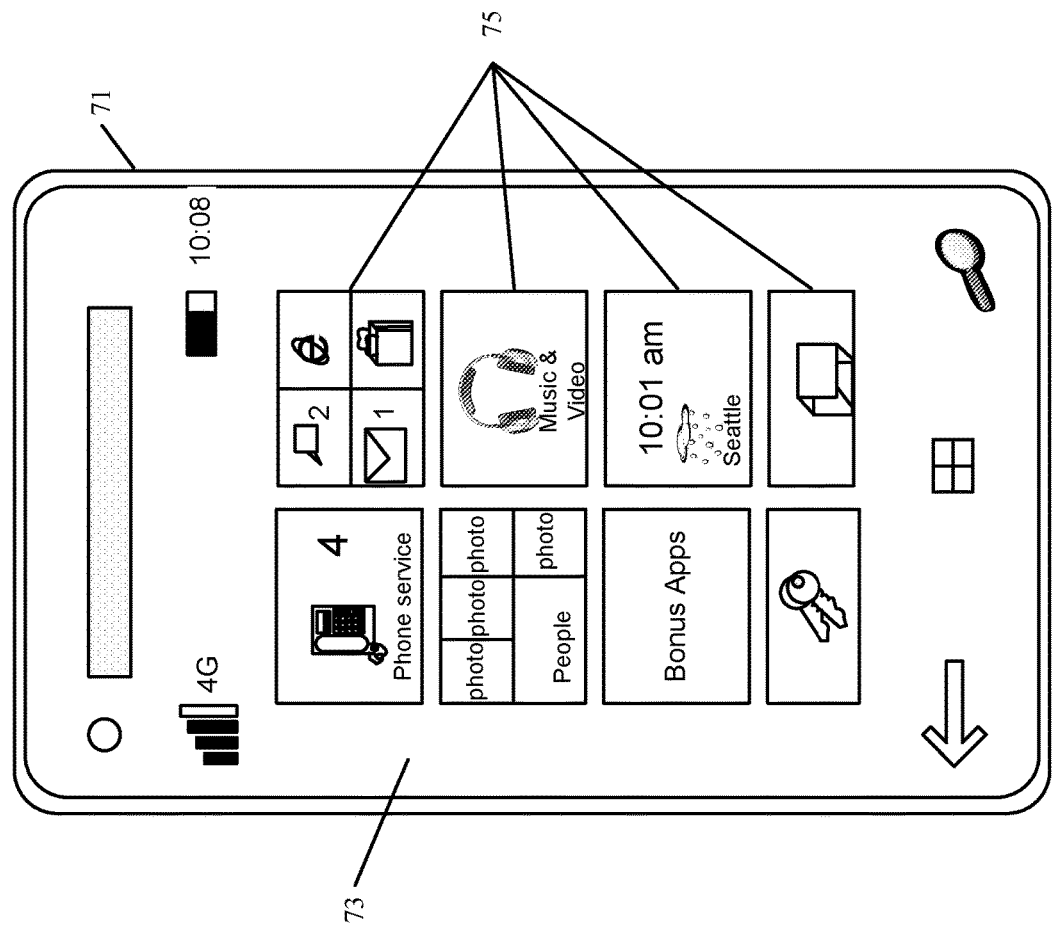

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 114 from FIGS. 1 and 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
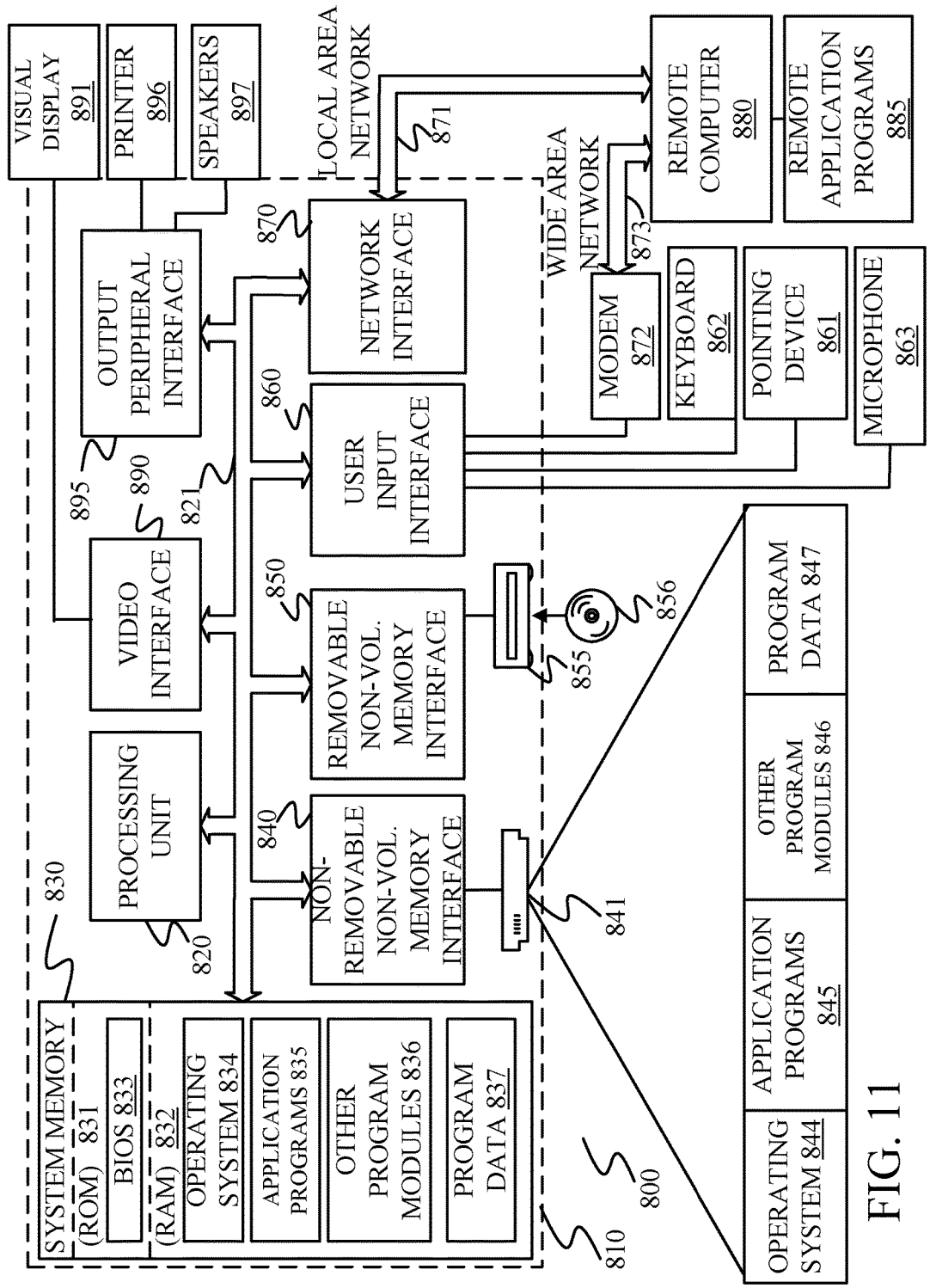
FIG. 11 is a block diagram of one example of a computing environment that can be used in the architectures shown in previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers 114) or those on other user devices, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an application component that runs a parent application for performing a process, the parent application component including a parent navigation system that navigates a user through a plurality of parent application pages, each parent application page having display elements representing an application object; and a sub-application runtime system that launches and runs a sub-application for performing a task, from within the parent application, the sub-application runtime system including a sub-application navigation system that navigates the user through a plurality of sub-application pages, each sub-application page having a set of display elements comprising a subset of display elements on a parent application page.

Example 2 is the computing system of any or all previous examples wherein the sub-application runtime system comprises:

cross-page eventing logic that detects an event on a displayed page, of the sub-application pages, and notifies another of the sub-application pages of the detected event.

Example 3 is the computing system of any or all previous examples wherein the sub-application runtime system comprises:

cross-page error handling logic that detects an error on a displayed page, of the sub-application pages, and generates an error on another of the sub-application pages based on the detected error.

Example 4 is the computing system of any or all previous examples wherein the sub-application runtime system comprises:

sub-application container generation logic that generates a task-based flow container with at least a first of the sub-application pages and a navigation stack.

Example 5 is the computing system of any or all previous examples wherein the sub-application runtime system comprises:

launch point detector logic that detects a launch point indicator, corresponding to the sub-application, from within the parent application.

Example 6 is the computing system of any or all previous examples wherein the sub-application container generation logic comprises:

flow identifier logic that identifies the sub-application to be launched based on the launch point detector logic detecting the launch point indicator.

Example 7 is the computing system of any or all previous examples wherein the sub-application container generation logic comprises:

page identifier logic that accesses sub-application metadata defining the identified sub-application to identify the first sub-application page for the identified sub-application.

Example 8 is the computing system of any or all previous examples wherein the sub-application container generation logic comprises:

data logic that accesses the sub-application metadata and retrieves data and controls for the first sub-application page and populates the first sub-application page with the retrieved data and controls.

Example 9 is the computing system of any or all previous examples wherein the sub-application navigation system comprises:

navigation detector logic that detects a navigation input from a displayed sub-application page.

Example 10 is the computing system of any or all previous examples wherein the sub-application runtime system comprises:

a logic handling system that executes branching logic corresponding to the displayed sub-application page, based on a state of the displayed sub-application page and the navigation input, to identify a next sub-application page.

Example 11 is the computing system of any or all previous examples wherein the data logic comprises data save logic that identifies any data to be saved from the sub-application, identifies the application objects where the identified data is to be saved, and pushes the data to be saved to the identified application objects.

Example 12 is the computing system of any or all previous examples wherein the sub-application navigation system comprises:

navigation stack manager logic that navigates to the next sub-application page identified by the logic handling system.

Example 13 is the computing system of any or all previous examples wherein the logic handling system identifies a child sub-application to launch based on the state of the displayed sub-application page and the navigation input, the sub-application runtime system pausing the sub-application, launching the child sub-application, and later resuming the sub-application.

Example 14 is a computer implemented method, comprising:

performing a process in a running parent application, by navigating a user through a plurality of parent application pages, each parent application page having display elements representing an application object; and launching and running a sub-application for performing a task, from within the parent application, by navigating the user through a plurality of sub-application pages, each sub-application page having a set of display elements comprising a subset of display elements on at least one parent application page.

Example 15 is the computer implemented method of any or all previous examples wherein running the sub-application comprises:

detecting an event on a displayed page, of the sub-application pages; and notifying another of the sub-application pages of the detected event.

Example 16 is the computer implemented method of any or all previous examples wherein running the sub-application comprises:

detecting an error on a page, of the sub-application pages; and generating an error on a page of the sub-application pages based on the detected error.

Example 17 is the computer implemented method of any or all previous examples wherein running the sub-application comprises:

generating a task-based flow container with at least a first of the sub-application pages and a navigation stack;

receiving a user input through a user input mechanism on the first sub-application page;

executing sub-application branching logic based on the user input and based on data in the sub-application; and navigating the user through the navigation stack based on execution of the sub-application branching logic.

Example 18 is the computer implemented method of any or all previous examples wherein launching and running the sub-application comprises:

detecting actuation of a launch point control, corresponding to the sub-application, from within the parent application;

identifying the sub-application to be launched based on detecting actuation of the launch point control;

accessing sub-application metadata defining the identified sub-application to identify the first sub-application page for the identified sub-application;

retrieving data and controls for at least the first sub-application page; and populating the first sub-application page with the retrieved data and controls.

Example 19 is the computer implemented method of any or all previous examples wherein running the sub-application comprises:

before navigating the user, identifying any data to be saved from the displayed sub-application page;

identifying the application objects where the identified data is to be saved; and pushing the data to be saved to the identified application objects.

Example 20 is a computing system comprising:

an application component that runs a parent application for performing a process, the parent application component including a parent navigation system that navigates a user through a plurality of parent application pages, each parent application page having display elements representing an application object;

a sub-application runtime system that launches and runs a sub-application for performing a task, from within the parent application, the sub-application runtime system including:

a sub-application navigation system that navigates the user through a plurality of sub-application pages, each sub-application page having a set of display elements comprising a subset of display elements on a parent application page;

cross-page eventing logic that detects an event on a displayed page, of the sub-application pages, and notifies another of the sub-application pages of the detected event;

cross-page error handling logic configured to detect an error on the displayed page, of the sub-application pages, and generate an error on another of the sub-application pages based on the detected error; and a logic handling system that identifies a child sub-application to launch based on the state of the displayed sub-application page and a detected navigation input, the sub-application runtime system launching the child sub-application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to provide:
an application component configured to:
run a parent application; and
navigate a user through a plurality of parent application pages, each parent application page having user interface (UI) controls;
launch point detector logic configured to detect a launch point indicator that is indicative of a launch point corresponding to a task associated with an application object in the parent application;
flow identifier logic configured to identify a sub-application to be launched based on the launch point indicator; and
a sub-application runtime system configured to:
launch the identified sub-application having a sub-application page configured to perform the task, the sub-application page having a set of UI controls comprising a subset of the UI controls on a parent application page;
receive an indication of user input through the sub-application page; and
provide data associated with the user input to the application object in the parent application.

2. The computing system of claim 1 wherein the sub-application page comprises a first sub-application page of a plurality of sub-application pages, and the sub-application runtime system is configured to:
detect an event on the first sub-application page; and
provide a notification, indicative of the detected event, to a second one of the sub-application pages.

3. The computing system of claim 1 wherein the sub-application page comprises a first sub-application page of a plurality of sub-application pages, and the sub-application runtime system is configured to:
detect an error on the first sub-application page; and
generate an error on a second one of the sub-application pages based on the detected error.

4. The computing system of claim 1 wherein the sub-application runtime system is configured to:
generate a task-based flow container with at least the sub-application page and a navigation stack.

5. The computing system of claim 4 wherein the navigation stack is separate from the parent application.

6. The computing system of claim 5 wherein the sub-application container generation logic is configured to:
run the sub application sub-application by executing navigation logic.

7. The computing system of claim 6 wherein the sub-application runtime system is configured to:
access sub-application metadata associated with the sub-application; and
based on the sub-application metadata, identify the sub-application page.

8. The computing system of claim 7 wherein the sub-application runtime system is configured to:
based on the sub-application metadata,
retrieve the data and the UI controls for the sub-application page, and
populate the sub-application page with the retrieved data and UI controls.

9. The computing system of claim 8 wherein the sub-application runtime system is configured to:
detect a navigation input from the sub-application page.

10. The computing system of claim 9 wherein the sub-application page comprises a first sub-application page of a plurality of sub-application pages, and the sub-application runtime system is configured to:
based on a state of the first sub-application page and the navigation input, execute branching logic corresponding to the first sub-application page to identify a second one of the sub-application pages.

11. The computing system of claim 10 wherein the data logic comprises data save logic configured to:
identify data to be saved from the sub-application;
identify the application object where the identified data is to be saved; and
push the data to be saved to the identified application object.

12. The computing system of claim 11 wherein the sub-application runtime system is configured to:
navigate to the second sub-application page.

13. The computing system of claim 12 wherein the sub-application runtime system is configured to:
based on the state of the displayed sub-application page and the navigation input, identify a child sub-application to launch;
pause the sub-application;
launch the child sub-application; and
later resume the sub-application.

14. A computer implemented method, comprising:
running parent application that navigates a user through a plurality of parent application pages, each parent application page having user interface (UI) controls;
detecting a launch point indicator that is indicative of a launch point corresponding to a task associated with an application object in the parent application;
identifying a sub-application to be launched based on the launch point indicator; and
running the sub-application having a sub-application page configured to perform the task, the sub-application page having a set of UI controls comprising a subset of the UI controls on at least one of the parent application pages;
receiving an indication of user input through the sub-application page; and
providing data associated with the user input to the application object in the parent application.

15. The computer implemented method of claim 14 wherein the sub-application page comprises a first sub-application page of a plurality of sub-application pages, and running the sub-application comprises:
detecting an event on the first sub-application page; and
notifying a second one of the sub-application pages of the detected event.

16. The computer implemented method of claim 15 wherein running the sub-application comprises:
detecting an error on the first sub-application page; and
generating an error on the second sub-application page based on the detected error.

17. The computer implemented method of claim 14 wherein running the sub-application comprises:
generating a task-based flow container with at least the sub-application page and a navigation stack;
receiving an indication of a user input through a user input mechanism on the sub-application page;
executing sub-application branching logic based on the user input and based on data in the sub-application; and
navigating the user through the navigation stack based on execution of the sub-application branching logic.

18. The computer implemented method of claim 17 wherein launching and running the sub-application comprises:
detecting actuation of a launch point control, corresponding to the sub-application, from within the parent application;
identifying the sub-application to be launched based on detecting actuation of the launch point control;
accessing sub-application metadata defining the identified sub-application to identify the sub-application page;
retrieving data and controls for the sub-application page; and
populating the sub-application page with the retrieved data and controls.

19. The computer implemented method of claim 18 wherein running the sub-application comprises:
before navigating the user, identifying any data to be saved from the sub-application page;
identifying the application object where the identified data is to be saved; and
pushing the data to be saved to the identified application object.

20. A computing system comprising:
a processor; and
memory storing instructions executable by the processor, wherein the instructions, when executed, configure the computing system to:
run a parent application for performing a process, the parent application component including a parent navigation system that navigates a user through a plurality of parent application pages, each parent application page having UI controls representing an application object;
run a sub-application for performing a task, from within the parent application;
navigate the user through a plurality of sub-application pages, each sub-application page having a set of UI controls comprising a subset of UI controls on a parent application page;
detect an event on a displayed page, of the sub-application pages, and notifies another of the sub-application pages of the detected event;
detect an error on the displayed page, of the sub-application pages;
generate an error on another of the sub-application pages based on the detected error; and
identify a child sub-application to launch based on the state of the displayed sub-application page and a detected navigation input; and
launch the child sub-application.

* * * * *